United States Patent
Bishnoi (10) Patent No.: US 12,416,273 B2
(45) Date of Patent: Sep. 16, 2025

(54) COMPRESSION IGNITION ENGINE, COMMERCIAL VEHICLE, AND METHOD FOR IMPROVING STARTING BEHAVIOUR

(71) Applicant: DAF Trucks N.V., Eindhoven (NL)

(72) Inventor: Sagar Bishnoi, Eindhoven (NL)

(73) Assignee: DAF Trucks N. V., Eindhoven (NL)

( * ) Notice: Subject to any disclaimer, the term of this patent is extended or adjusted under 35 U.S.C. 154(b) by 0 days.

(21) Appl. No.: 18/798,884

(22) Filed: Aug. 9, 2024

(65) Prior Publication Data

US 2025/0052209 A1    Feb. 13, 2025

(30) Foreign Application Priority Data

Aug. 10, 2023 (NL) .................... 2035587

(51) Int. Cl.
  *F02D 41/40* (2006.01)
  *F02D 13/02* (2006.01)
  *F02D 41/06* (2006.01)
(52) U.S. Cl.
  CPC ....... *F02D 41/403* (2013.01); *F02D 13/0234* (2013.01); *F02D 41/064* (2013.01);
  (Continued)
(58) Field of Classification Search
  CPC .... F02D 41/403; F02D 41/401; F02D 41/402; F02D 41/064; F02D 13/0234; F02D 13/0269; F02D 35/024; F02D 2200/101; F02D 2200/704; F02D 2400/02; F02D 2200/703; F02D 2200/021; F02D 2200/0414; F02D 2013/0292; F02D 2041/389; Y02T 10/12
  See application file for complete search history.

(56) References Cited

U.S. PATENT DOCUMENTS 7,207,311 B2  4/2007  Chmela et al.
8,985,086 B2  3/2015  Shishime et al.
(Continued)

FOREIGN PATENT DOCUMENTS

DE  102004053748 A1  5/2006
DE  102016015251 A1  6/2017
(Continued)

OTHER PUBLICATIONS

Dutch Search Report and Written Opinion—App No. 2035587—mailing date Feb. 1, 2024.

*Primary Examiner* — Grant Moubry
(74) *Attorney, Agent, or Firm* — Banner & Witcoff, Ltd.

(57) ABSTRACT

A compression ignition engine, commercial vehicle comprising such an engine, and a method for improving starting behaviour of such an engine. The engine is operable in a normal mode or a cold start mode. In the normal mode, a fuel injection system is controlled to inject a main fuel injection in a single pulse. In the cold start mode, the main fuel injection is split into a first split main and a second split main. The fuel injection system is controlled to inject the first and second split main in two distinct pulses, wherein the first split main is injected at a delayed timing for initiating a diffusion combustion phase in the pressurized combustion chamber, and wherein the second split main is injected during the diffusion combustion phase into the already combusting air-fuel mix.

16 Claims, 5 Drawing Sheets

(52) U.S. Cl.
CPC .. *F02D 2200/101* (2013.01); *F02D 2200/704* (2013.01); *F02D 2400/02* (2013.01)

(56) References Cited

U.S. PATENT DOCUMENTS

| | | |
|---|---|---|
| 9,903,307 B2 | 2/2018 | Polonowski et al. |
| 10,100,767 B2 | 10/2018 | Liu et al. |
| 10,458,345 B2 | 10/2019 | Jung et al. |
| 10,982,617 B2 | 4/2021 | Luo et al. |
| 11,352,969 B2 | 6/2022 | Koo |
| 2006/0272608 A1 | 12/2006 | Hara et al. |
| 2013/0041571 A1* | 2/2013 | Nogi ................. F02D 41/06 701/103 |
| 2016/0356228 A1* | 12/2016 | Liu ................. F02P 5/1506 |
| 2018/0195457 A1 | 7/2018 | Negami et al. |
| 2020/0332704 A1* | 10/2020 | Maruyama ............. F02B 11/00 |
| 2023/0129315 A1 | 4/2023 | Blumreiter et al. |

FOREIGN PATENT DOCUMENTS

| | | |
|---|---|---|
| EP | 2758650 A1 | 7/2014 |
| EP | 3273038 A1 | 1/2018 |
| EP | 3553301 A1 | 10/2019 |
| EP | 3557033 A1 | 10/2019 |
| EP | 3591197 A1 | 1/2020 |
| FR | 3072424 A1 | 4/2019 |

\* cited by examiner

COMPRESSION IGNITION ENGINE, COMMERCIAL VEHICLE, AND METHOD FOR IMPROVING STARTING BEHAVIOUR

CROSS REFERENCE TO RELATED APPLICATIONS

This application claims the benefit of priority of Dutch patent application NL2035587, filed Aug. 10, 2023, the entire contents of which is hereby incorporated by reference herein.

FIELD OF THE INVENTION

The invention relates to a compression ignition engine, a commercial vehicle comprising such a compression ignition engine, and a method for improving cold start behavior of a compression ignition engine.

BACKGROUND

A compression ignition engine, such as a Diesel engine is an internal combustion engine in which ignition of the fuel is caused by the elevated temperature of the air in the cylinder due to mechanical compression; thus, the diesel engine is a so-called compression-ignition engine (CI engine).

This is especially a problem at low engine speeds, e.g. during starting, since there is more time for compressed air to leak to the crankcase (blow-by) resulting in even lower compression pressure and therefore lower temperatures (too low to initiate combustion), but also because there is more time for heat transfer from the compressed air in the cylinder and the cold engine parts.

The problem is larger at lower ambient temperatures, such as during cold start, since lower temperatures of incoming air result in lower end compression temperature, and since the cranking speed is reduced due to high engine friction as a result of more viscous engine-oil.

At low engine speeds, e.g. during starting, a turbocharger or supercharger is not effective and there is no positive contribution of pre-compressed and pre-heated air that goes into the cylinder. As a result, the engine may have difficulties in starting or maintaining idle speed, or may not be able to start at all.

At altitude, the problem is even more severe, because the mass of the incoming air is less due to lower ambient pressure, and the heat flow from the cylinder to the cold surroundings may result in even lower temperatures in the cylinder when fuel injection starts.

For a successful start, enough power needs to be generated in order to overcome the inertia of parts to be moved, and friction therebetween (which is higher in a cold engine/viscous engine-oil), and to be able to rev-up. Increasing the fuel quantity injected into the cylinder, to generate more power, may further reduce the cylinder temperature due to evaporation. Therefore, a large amount of fuel injected during starting can cause poor starting behavior. This may particularly be a problem for a cold start at altitude, when the incoming air is at a relatively low temperature and pressure, since increasing the amount of injected fuel may create an air-fuel mixture that is too rich to ignite.

Some compression ignition engines may run on a Miller cycle, which reduces the effective in-cylinder volume and therefore the effective compression ratio, resulting in even lower temperatures near top-dead-center where injection takes place.

It is known to inject pilot fuel before injecting the main fuel quantity. However, such a pilot injection should either be small enough or early enough in the compression cycle that it doesn't have significant negative effects due to evaporation on the in-cylinder temperature, to prevent poor starting behavior.

It is an object of the present invention to improve cold starting behavior of a compression ignition engine.

SUMMARY

In summary, the invention provides a compression ignition engine with a plurality of cylinders. The compression ignition engine comprises a valve actuation system, a fuel injection system, and a controller. The valve actuation system is arranged for opening and closing intake valves and exhaust valves of each cylinder of said plurality of cylinders. The fuel injection system is arranged for injecting fuel into a combustion chamber of each cylinder. The controller is arranged for controlling the valve actuation system and the fuel injection system.

The controller is arranged for selecting between a normal mode and a cold start mode for operating the compression ignition engine.

In the normal mode, the controller is arranged for controlling the fuel injection system to inject a main fuel injection in a single pulse between 3.5 degrees crank angle before and 4.5 degrees crank angle after top dead center (TDC) in the power stroke, to power the engine;

In the cold start mode, the controller is arranged for splitting the single main fuel injection pulse into distinct first and second split main pulses, and the controller is arranged for controlling the fuel injection system to inject the first split main pulse at a delayed timing relative to the main injection timing of the normal mode, for initiating a diffusion combustion phase in the pressurized combustion chamber, and to inject the second split main pulse during the diffusion combustion phase into the already combusting air-fuel mix.

As a result, more power is generated, e.g. for starting the engine, without changing the total amount of fuel injected into the cylinder.

So rather than reducing the main fuel injection quantity which may result in insufficient power to overcome the engine's friction and inertia, e.g. at relatively low ambient temperatures and pressures, and rather than increasing the main fuel injection quantity which may result in an even lower cylinder temperature, the first split main comprises a quantity of fuel that is reduced by a portion compared to the main fuel injection, which portion is injected later in the combustion cycle during the diffusion-combustion-phase when the combustion is already in progress.

By splitting the main injection into distinct first and second split main pulses, thus dividing the total amount of fuel of the main injection into two separate portions, the first split main pulse in the cold start mode effectively ends earlier, which causes the in-cylinder heat-release to occur closer to (but still after) top dead center. Thus, the ignition delay is reduced, which is desirable for flame propagation and effective engine power.

Moreover, the second split main pulse provides a pseudo-diffusion phase combustion by injecting a portion of fuel in the already combusting air-fuel mix during the diffusion combustion phase, i.e. while in-cylinder pressure is still increasing. This results in overall higher engine power, and therefore better cold start performance.

Preferably, the controller is arranged for calculating and calibrating a start and an end of the first split main pulse with reference to TDC, and for calculating and calibrating a start and an end of the second split main pulse with reference to the end of the first split main pulse.

In some embodiments, the first split main pulse comprises a fuel quantity between 75% and 98% of a fuel quantity of the main fuel injection pulse, and the controller is arranged for controlling the fuel injection system to start injecting the first split main pulse between TDC and 4.5 degrees crank angle after TDC. By initially injecting a thus reduced amount of fuel into the combustion chamber in the power stroke, the ignition delay is smaller compared to the normal mode, in which the full amount of fuel is injected in a single pulse, while still providing sufficient power to initially overcome the engine's friction and inertia.

In other or further embodiments, the second split main pulse comprises a fuel quantity between 2 to 25% of a fuel quantity of the main fuel injection pulse, and the controller is arranged for controlling the fuel injection system to start injecting the second split main at 0 to 7 degrees crank angle after an end of the first split main. In this way, the energy generated in the diffusion combustion phase that can effectively be employed is amplified, without increasing the total amount of fuel injected into the combustion chamber.

In one embodiment, the controller is arranged for selecting the cold start mode when the ambient temperature, or coolant temperature, is below a temperature threshold value and/or the ambient pressure is below a pressure threshold value. For example, the temperature threshold value can be between-40 and 10 degrees Celsius, e.g. between-10 and 0 degrees Celsius. The pressure threshold value can e.g. be between 60 and 95 kPa, e.g. between 80 and 95 kPa. The pressure and temperature threshold value can e.g. be obtained from a lookup table, or may be pre-programmed into the controller.

At higher engine speeds, the ignition compression engine can make use of a turbocompressor to increase in-cylinder pressure. Also, due to the decreased time window for injecting fuel into the combustion chamber, it may be more difficult to inject distinct fuel pulses. For this reason, controller may be arranged for switching between the normal mode and the cold start mode in dependence of engine speed. For example, the switch may occur at or beyond engine idle speed, e.g. at an engine speed at which a turbocharger of the engine is effective. The idle speed may be around 550 RPM, e.g. between 500-600 RPM. In more advanced embodiments, the controller is arranged for switching between the normal mode and the cold start mode in dependence of an actual compression pressure. This provides an accurate and effective way of selecting between the cold start mode and the normal mode, to improve starting/low speed behaviour of the engine only when needed.

To improve the diffusion combustion phase, the controller can be further arranged for controlling the fuel injection system to inject a pilot injection into the combustion chamber before a start of the main fuel injection. For example, the pilot injection may be between 7.5% and 17.5% of the main fuel injection, and the controller may be arranged for controlling the fuel injection system to start injecting the pilot injection between 27 and 1.5 degrees crank angle before the start of the main fuel injection.

Other aspects of the present invention relate to a commercial vehicle, comprising a compression ignition engine according to any of the preceding claims.

Other aspects of the invention relate to a method for improving cold start behaviour of a compression ignition engine comprising a plurality of cylinders, a valve actuation system arranged for opening and closing intake valves and exhaust valves of each cylinder of said plurality of cylinders, and a fuel injection system arranged for injecting fuel into a combustion chamber of each cylinder.

The method comprises the steps of:
selecting between a normal mode and a cold start mode for operating the compression ignition engine;
in the normal mode, controlling the fuel injection system to inject a main fuel injection in a single pulse between 3.5 degrees crank angle before and 4.5 degrees crank angle after TDC in the power stroke, to power the engine;
in the cold start mode, splitting the single main fuel injection pulse into distinct first and second split main pulses, and controlling the fuel injection system to inject the first split main pulse at a delayed timing for initiating a diffusion combustion phase in the pressurized combustion chamber, and to inject the second split main pulse during the diffusion combustion phase into the already combusting air-fuel mix.

BRIEF DESCRIPTION OF THE DRAWINGS

The invention will be further elucidated in the figures.

DETAILED DESCRIPTION

The invention is described more fully hereinafter with reference to the accompanying drawings, in which embodiments of the invention are shown. In the drawings, the absolute and relative sizes of systems, components, layers, and regions may be exaggerated for clarity. Embodiments may be described with reference to schematic and/or cross-section illustrations of possibly idealized embodiments and intermediate structures of the invention. In the description and drawings, like numbers refer to like elements throughout. Relative terms as well as derivatives thereof should be construed to refer to the orientation as then described or as shown in the drawing under discussion. These relative terms are for convenience of description and do not require that the system be constructed or operated in a particular orientation unless stated otherwise.

Figure 1:
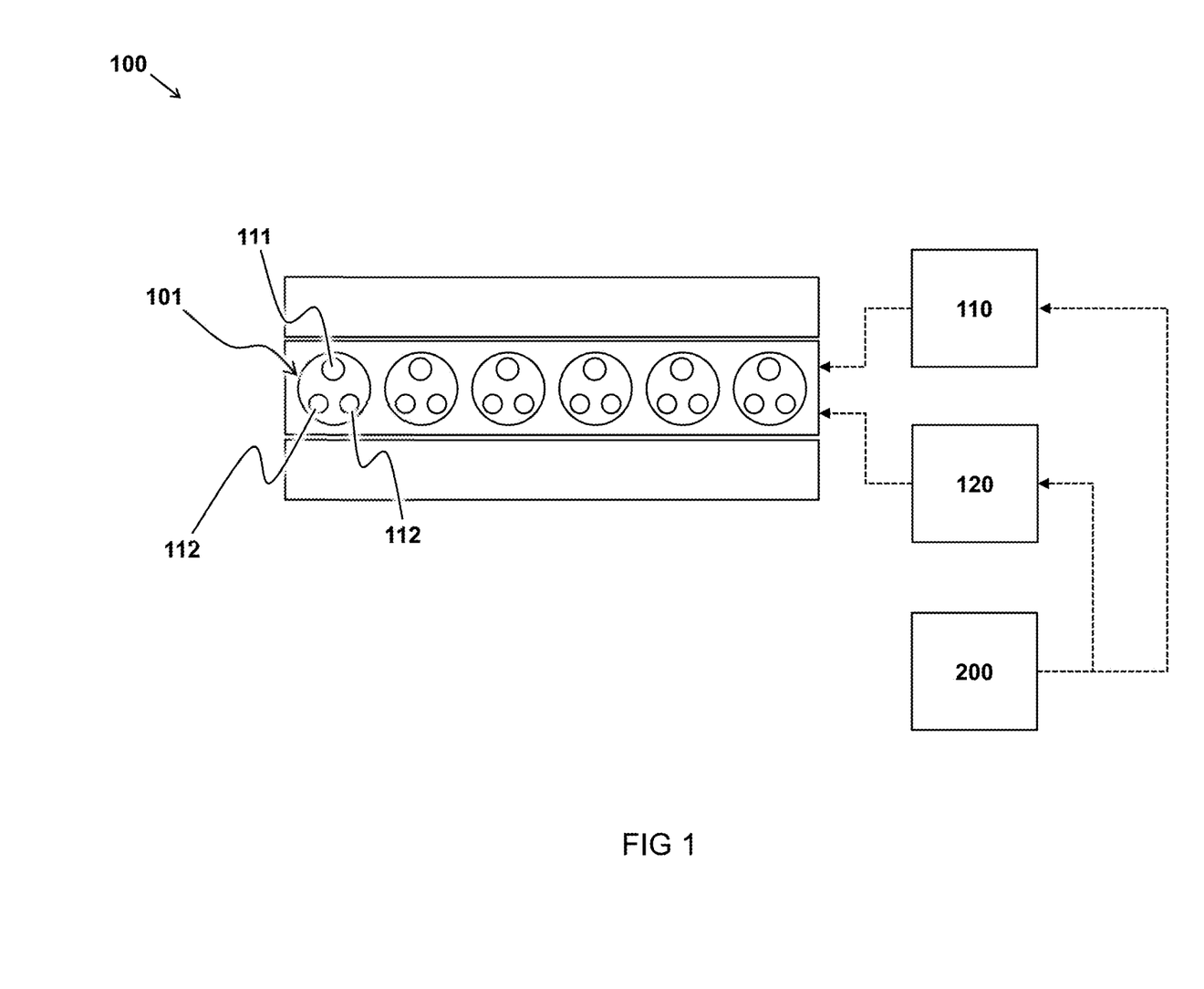
FIG. 1 illustrates an embodiment of a compression ignition engine.

FIG. 1 illustrates a top view of an embodiment of a compression ignition engine 100, e.g. a Diesel engine, comprising six cylinders 101 in an inline configuration. The compression ignition engine 100 may comprise any other number of cylinders, e.g. three, four, eight or twelve, arranged in any other cylinder configuration and in one or more cylinder banks, e.g. in a line, in a V, or horizontally opposed. For example, the ignition compression engine 100 may be a straight-six, a V8, or a flat-four.

Each cylinder 101 comprises one or more intake valves 111 for intaking air into the cylinder 101, e.g. via an intake manifold and air filter, and one or more exhaust valves 112 for discharging exhaust gas from the cylinder 101, e.g. into an exhaust manifold and exhaust line. Preferably, the engine 100 comprises a turbocompressor to boost pressure in the intake manifold, and/or an EGR system to recirculate exhaust gases into the cylinders.

A valve actuation system 110 is arranged for opening and closing the one or more intake valves 111 and exhaust valves 112 of each cylinder 101, e.g. via a cam shaft. The valve actuation system 110 may be a variable valve actuation system, e.g. comprising electronically controllable valve actuators, to allow timing adjustment of opening and closing the intake valves and exhaust valves.

A fuel injection system 120, e.g. comprising a fuel rail and a plurality of fuel injectors, is arranged for injecting fuel into a combustion chamber of each cylinder.

The compression ignition engine may be operated, by a controller 200, such that each cylinder is arranged for conducting a four-stroke Miller cycle. In the Miller cycle, the intake valve is generally left open longer than it would be in a normal Diesel-cycle engine. In effect, the compression stroke is two discrete cycles: the initial portion when the intake valve is open and final portion when the intake valve is closed. This two-stage compression stroke creates the so-called "fifth" stroke that the Miller cycle introduces. Hence, the Miller cycle for example comprises:

(i) an intake stroke in which, as the piston moves from top dead center (TDC) towards bottom dead center (BDC), the valve actuation system 110 is controlled, e.g. by the controller 200, to have the one or more intake valves 111 in an open position and the one or more exhaust valves 112 in a closed position, to intake air into the combustion chamber of the cylinder;

(ii) a two-stage compression stroke in which the piston moves from BDC towards TDC. The two stage compression stroke comprises a discharge stage and a compression stage.

In the discharge stage, the valve actuation system 110 is controlled, e.g. by the controller 200, to have the one or more intake valves 111 in an open position and the one or more exhaust valves 112 in a closed position, to discharge a first portion of the air from the combustion chamber through the one or more intake valves, e.g. back into the intake manifold. In other words, as the piston initially moves toward TDC in what is traditionally the compression stroke, the charge is partially expelled back out through the open intake valve(s) in the discharge stage. For example, the discharge stage ends between 30 and 60 degrees crank angle from BDC, preferably between 40 and 50 degrees crank angle from BDC. Delaying the closing of intake valves in the Miller cycle in effect shortens the compression stroke compared to the expansion stroke. This allows the gases to be expanded to atmospheric pressure, increasing the efficiency of the cycle.

In the subsequent compression stage, the remaining second portion of the air inside the exhaust chamber is compressed as the piston moves toward TDC by controlling the valve actuation system 110, e.g. by the controller 200, to have the one or more intake valves 111 and the one or more exhaust valves 112 in a closed position. In effect, in the Miller-cycle engine, the piston begins compression only after the one or more intake valves close, and the intake valves are closed after the piston has travelled a certain distance beyond BDC, e.g. around 20 to 30% of the total piston travel towards TDC. So in the Miller cycle engine, the piston actually compresses the air mixture only during the latter 70% to 80% of the compression stroke. During the initial part of the compression stroke, the piston pushes part of the fuel-air mixture through the still-open intake valve, and back into the intake manifold.

(iii) a power stroke, sometimes called expansion stroke, for powering the engine. When the piston is near TDC, e.g. between -4.5 and 3.5 degrees crank angle from TDC, the fuel injection system 120 is controlled, e.g. by the controller 200, to start injecting a main fuel injection into the pressurized combustion chamber. Due to the in-cylinder pressure and temperature the air-fuel mixture in the combustion chamber ignites. Meanwhile, the valve actuation system 110 is controlled, e.g. by the controller 200, to have the one or more intake and exhaust valves 111, 112 in a closed position. The igniting air-fuel mixture expands and pushes the piston downward, toward BDC.

Lastly, the four stroke Miller cycle may comprise (iv) an exhaust stroke, in which the valve actuation system is controlled, e.g. by the controller 200, to have the one or more intake valves 111 in a closed position and the one or more exhaust valves 112 in an open position, to discharge exhaust gas from the combustion chamber through the exhaust valve as the piston moves from BDC towards TDC.

In general, in the Miller cycle, the shortened compression stroke compared to the expansion stroke results in an increased efficiency of the engine. The reduced in-cylinder pressure and temperature caused by the Miller cycle creates a loss of power compared to a standard Diesel cycle. In engines running a Miller cycle, this loss can be compensated for by the use of a (VTG) turbocompressor. For normal operation of a Miller engine, the VTG turbocompressor may be calibrated to supply the same mass air flow as a standard Diesel cycle engine has, by increasing the boost pressure. The higher temperature of the compressed air supplied by the turbocompressor can be reduced by an intercooler before it enters the cylinders. Result is that despite the shorter compression stroke, the amount and temperature of the air in the cylinder is the same as in the standard Diesel cycle. In this way, the Miller cycle provides an improved fuel efficiency by having a longer expansion stroke with respect to the compression stroke, without reducing power of the engine. However, at low engine speeds, e.g. during cold start, the turbocompressor is not effective yet, so the reduced mass in the cylinder cannot be compensated, thereby attenuating the benefits of the Miller cycle.

To alleviate these issues, the controller 200 is arranged for operating the compression ignition engine in a normal mode or a cold start mode. In the normal mode, the controller 200 is arranged for controlling the fuel injection system 120 to inject the main fuel injection in a single pulse, e.g. between 3.5 degrees crank angle before TDC and 4.5 degrees crank angle after TDC. The main injection is intended to start the diffusion-combustion phase in the power stroke to power the engine. Besides a main fuel injection, the normal mode may comprise a pilot injection preceding the main fuel injection to premix the incoming air with fuel. For example, the pilot injection may have a fuel quantity between 7.5% and 17.5% of the fuel quantity of the main fuel injection, and the controller 200 may be arranged for controlling the fuel injection system 120 to start injecting the pilot injection between 27 and 1.5 degrees crank angle before the start of the main fuel injection.

Additionally, the normal mode may comprise a late or post fuel injection following the main fuel injection for thermal management and emission reduction. Preferably, the normal mode is active during operating conditions in which the ambient temperature is higher than 0, 5 or 10 degrees Celsius, and in which ambient pressure is about 100 kPa. Also, the normal mode may be activated after the engine is started, thus when the engine is running at idle speed or higher, which case by case may be dependent on e.g. the size and type of engine, engine load, and ambient conditions. In truck engines, for example, the idle speed may be around 550 RPM, e.g. between 500 and 600 RPM, while for passenger vehicle engines the idle speed may be around 1000 RPM, e.g. between 800-1000 RPM.

Preferably, the controller 200 is arranged for operating the compression ignition engine in the cold start mode when the ambient and/or coolant temperature is below a temperature threshold value, e.g. lower than 10, 5, 0, −5 or −10 degrees Celsius and/or when the ambient pressure is below a pressure threshold value, e.g. lower than 95, 90, 85 or 80 kPa, e.g. down to 60 kPa. In the cold start mode, the controller 200 is arranged for splitting the main fuel injection into a first split main and a second split main, and for controlling the fuel injection system 120 to inject the first and second split main in two distinct pulses. This can e.g. be seen in FIG. 2, which provides a graph of crank angle based in-cylinder pressure data at −15° C. and 100 kPa, for a Miller cycle compression ignition engine in the cold start mode (black) and in the normal mode (blue). It is clear from FIG. 2 that, in such ambient conditions, the cold start mode provides higher in-cylinder pressure in the power stroke, thus improving starting behaviour of the engine.

Preferably, the first split main has a fuel quantity between 75% and 98% of the fuel quantity of the main fuel injection, e.g. between 80% and 95%, and the controller 200 is arranged for controlling the fuel injection system to inject the first split main at a delayed timing between TDC and 4.5 degrees crank angle after TDC. Such a delayed timing ensures that the diffusion combustion phase is initialized after TDC, to improve the starting behaviour of the engine.

Conversely, the second split main preferably has a fuel quantity of 2-25% of the fuel quantity of the main fuel injection, e.g. between 5-20%, and the controller 200 is arranged for controlling the fuel injection system 120 to start injecting the second split main between 0.5 and 7 degrees crank angle after an end of the first split main, preferably between 1.5 and 5 degrees crank angle after the end of the first split main. Thus the first and second split main pulse are distinct, e.g. separated, from each other.

The controller 200 may be arranged for calculating and calibrating the start and end of the first split main pulse with respect to TDC, and for calculating and calibrating the start and end of the second split main pulse with respect to an end of the first split main pulse, to control the respective injected fuel quantities and timings. Similar to the normal mode, the cold start mode may also additionally comprise a pilot injection and/or a late or post fuel injection, which are thus not part of the (first and second) main injection pulse described herein.

Figure 2:
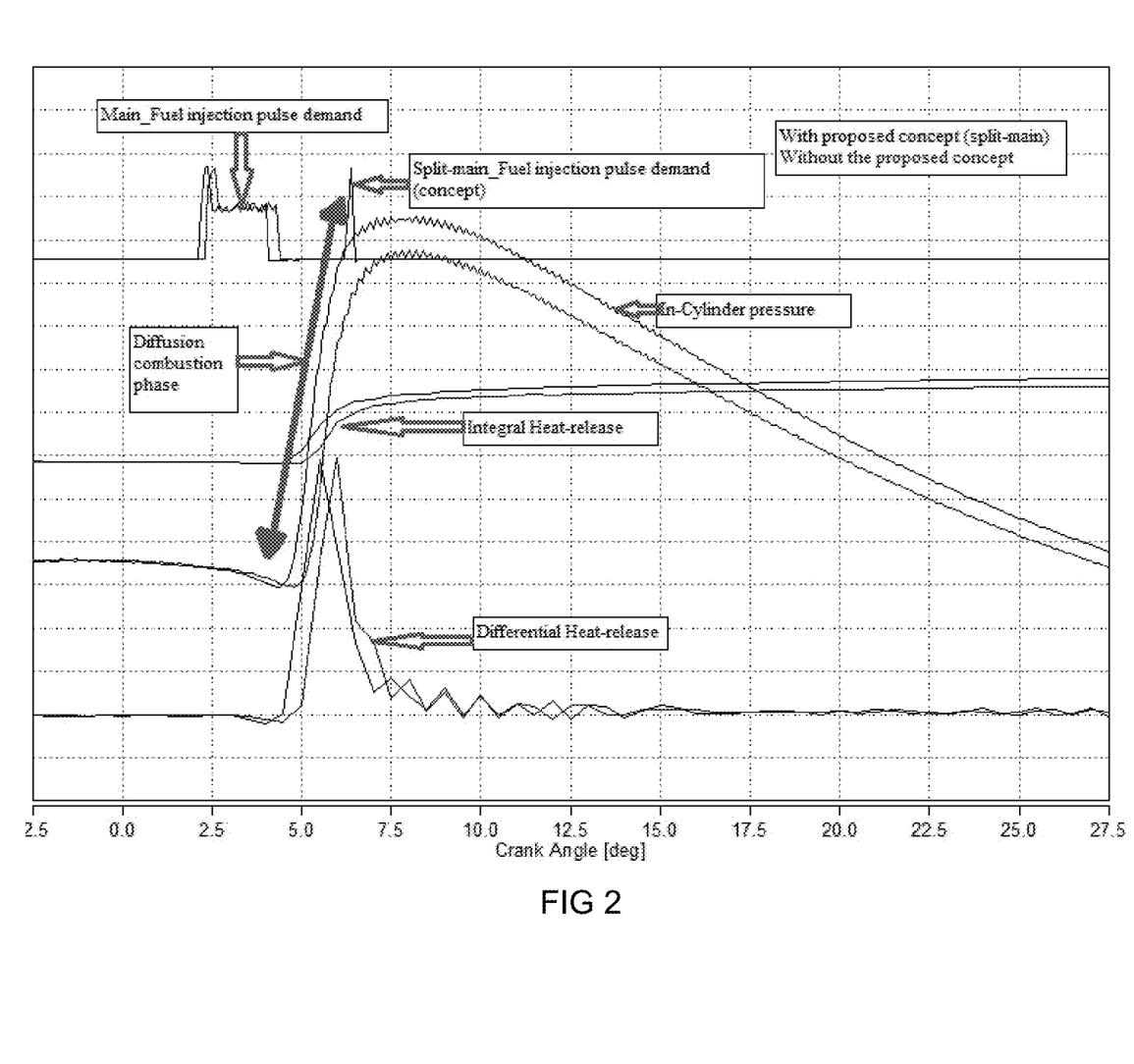
FIG. 2 provides a graph comparing the compression ignition engine operated in a normal mode and in a cold start mode.

In other words, according to the present invention, the main fuel injection is split into two parts: (A) the first split main, and (B) the second split main. Any fuel injection(s) performed before or after the main injection, such as pilot, post, or late injections, are not referred to as a split main pulse and may be entirely optional to the general concept of the invention. A pilot injection is considered to occur substantially before the main injection. A post or late injection is considered to occur after the end of the diffusion combustion phase, e.g. during the tail phase in which the in-cylinder pressure is decreasing. In the present invention, the first split main pulse is injected after TDC to initiate a diffusion combustion phase, and the second split main pulse is injected during the diffusion combustion phase while in-cylinder pressure is still increasing, e.g. as illustrated in FIG. 2.

The fuel quantity of the first split main and the fuel quantity of the second split main add up to the fuel quantity of the main fuel injection. However, the first and second split main are injected into the combustion chamber by two distinct (e.g. separate or intermittent) pulses. The first split main is injected for initiating diffusion combustion in the pressurized combustion chamber, and the second split main is injected during the diffusion combustion phase into the already combusting air-fuel mix.

Accordingly, the cold start behaviour of the engine, e.g. at low ambient temperatures and/or pressures, can be improved. Rather than reducing the main-injection quantity which may result in not-enough power to overcome the engine's friction and inertia, the main fuel injection is split. In other words, the main injection pulse is reduced by a certain amount, e.g. by 5-25%, which amount is introduced later in the combustion cycle during the diffusion-combustion-phase when the combustion is already in progress.

This provides a twofold benefit. The ignition delay is reduced (with reference to TDC) since the first split main pulse ends earlier than the single main fuel injection pulse, which causes the heat-release to occur closer to (yet still after) TDC, which is desirable for flame propagation and indicated mean effective pressure (IMEP).

Secondly, the distinct second split main allows for a pseudo-diffusion phase combustion where the remaining amount of fuel (5-25%) is injected in the already combusting air-fuel mix. This causes a higher IMEP overall, leading to better cold start performance, e.g. as illustrated in FIG. 2.

Hence, the split-main injection described herein can be regarded as an ignition delay reduction as well as an IMEP increase aid. Such a split-main injection strategy is not only applicable to Miller cold starts at altitude but also at sea-level ambient pressures, e.g. around 100 kPa.

Switching between the normal mode and the cold start mode can be performed in various ways. For example, the controller may be arranged for switching between the normal mode and the cold start mode based on an actual ambient temperature, an actual coolant temperature, and/or an actual ambient pressure. The actual ambient or coolant temperature and pressure may be measured, e.g. by sensors on board a vehicle comprising the compression ignition engine, or obtained from an external source based on geo-location of the vehicle. For example, when the actual ambient or coolant temperature and/or pressure is below a predetermined minimum value, the controller 200, in use, selects the cold start mode. Otherwise, in case the actual ambient or coolant temperature and/or pressure is higher than the predetermined minimum value, the normal mode is selected. The minimum value can e.g. be pre-programmed or obtainable from a look up table.

Alternatively, or additionally, the controller 200 may be arranged for switching between the normal mode and the cold start mode in response to an actual compression pressure in the cylinder, e.g. measured by a pressure sensor. The compression pressure of a compression ignition engine, such as a Diesel engine, can vary depending on the specific engine and its design. However, in general, Diesel engines may have compression pressures ranging from 150 to 300 bar. In a compression ignition engine, the compression temperature of air can be about 500-600 degree Celsius. The compression pressure needs to be high to have efficient combustion to take place and avoid any ignition lag. Generally, the compression pressure is reduced by operating a Miller cycle on an engine.

Compression pressure and temperature can be used as an indicator for switching between the normal mode and the cold start mode. For example, in case the compression pressure and/or compression temperature is below a threshold, the controller 200, in use, may switch from the normal mode to the cold start mode. Conversely, when the compression pressure and/or compression temperature exceeds a threshold, the controller 200 may switch from the cold start mode to the normal mode.

Alternatively, or additionally, the controller may be arranged for switching between the normal mode and the cold start mode in response to an average in-cylinder pressure, e.g. calculated over one or more combustion cycles per cylinder. As such, an indication of the work performed by each cylinder can be obtained, and, in use, the controller for example switches from the normal mode to the cold start mode when the average in-cylinder pressure is below a threshold, and switches vice versa when the average in-cylinder pressure is higher than a threshold.

Figure 3:
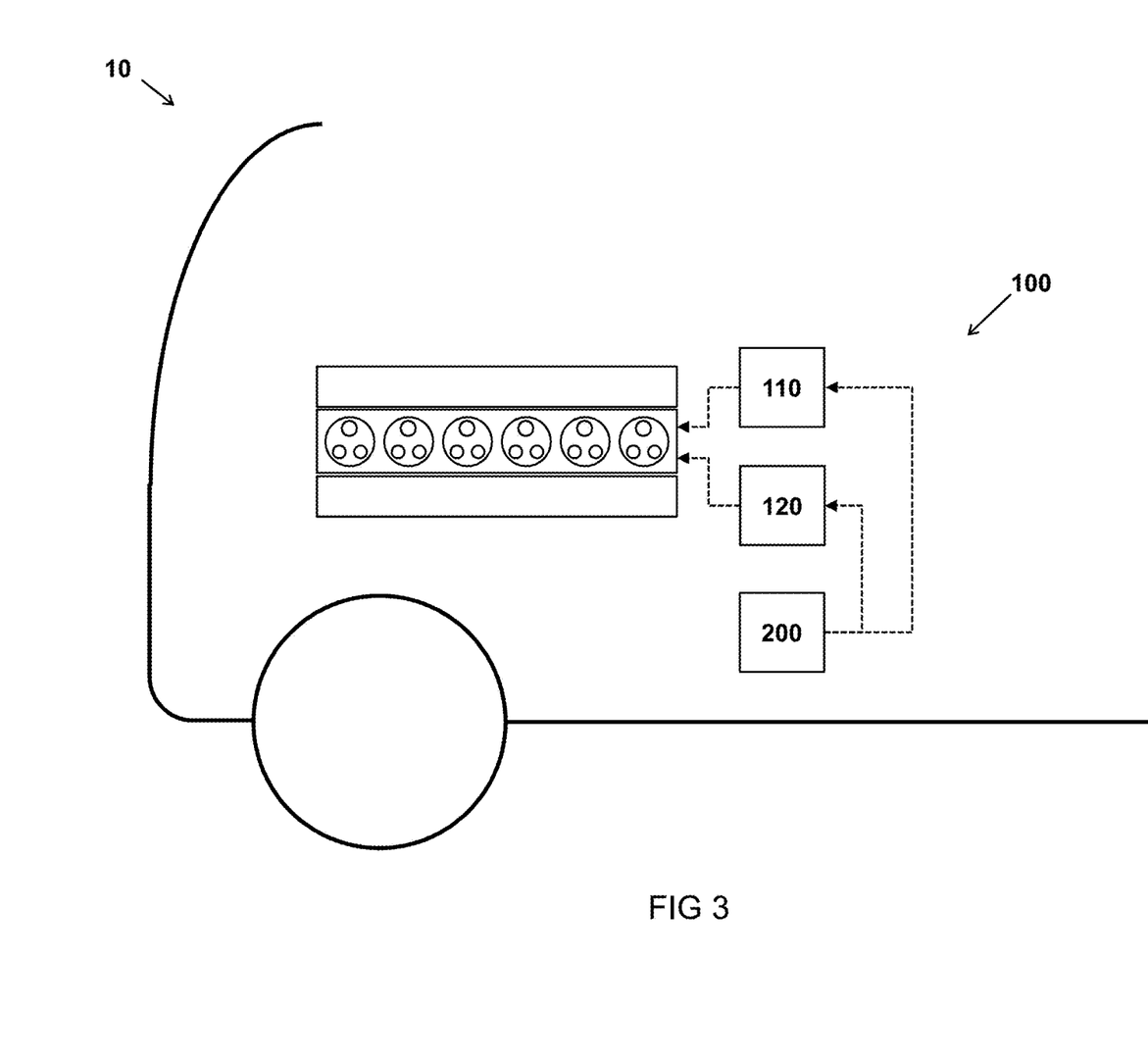
FIG. 3 illustrates an embodiment of a commercial vehicle comprising a compression ignition engine as described herein.
Figure 4:
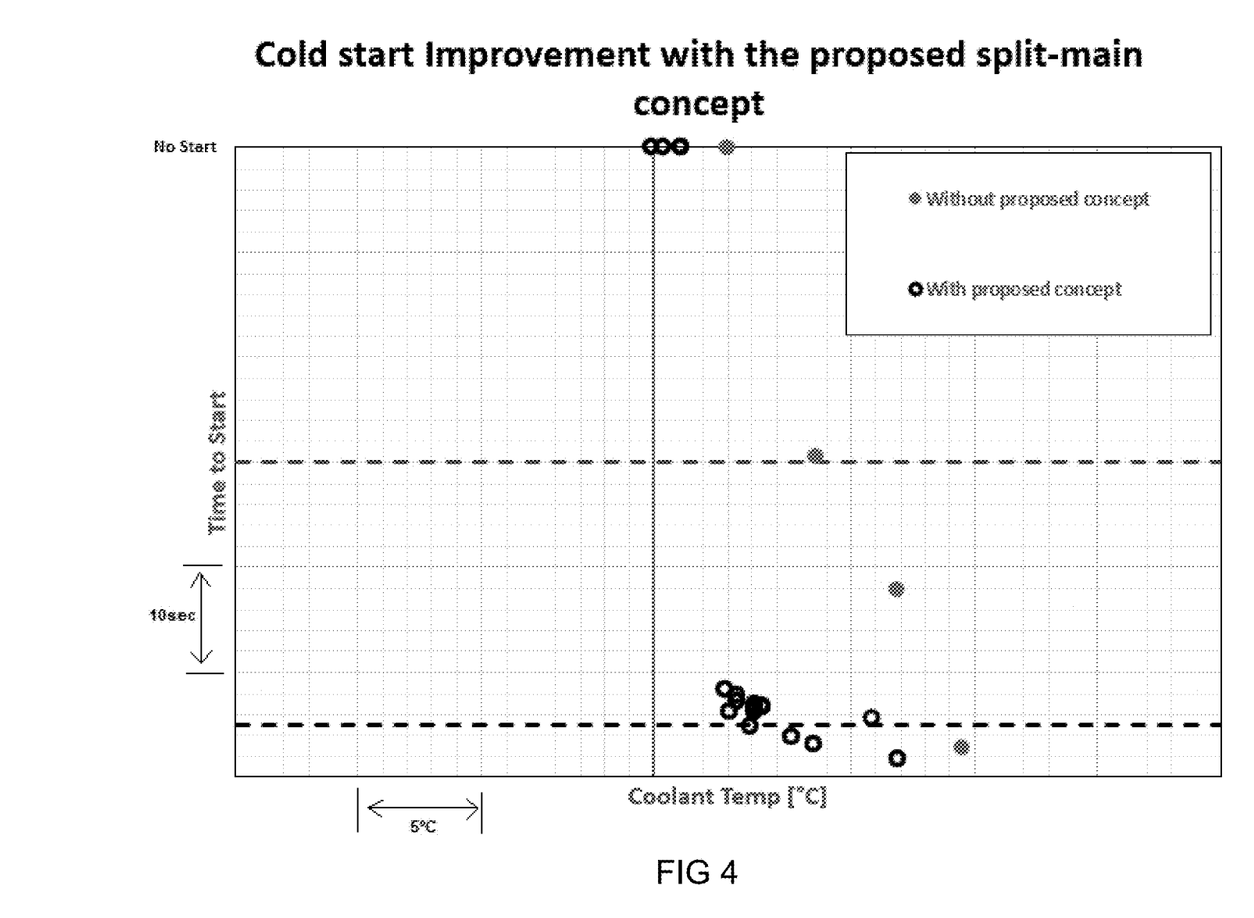
FIG. 4 provides a graph quantifying starting behaviour of the compression ignition engine in the normal and cold start mode.

FIG. 3 illustrates an embodiment of a commercial vehicle, such as a truck, bus, touring car, heavy duty vehicle or passenger car. The commercial vehicle 10 comprises a compression ignition engine 100 described herein. Accordingly, as illustrated in FIG. 4, the cold start behaviour of the commercial vehicle is improved, e.g. allowing the commercial vehicle to start more rapidly in relatively cold ambient temperatures, e.g. below 10 degrees Celsius, and/or at relatively high altitudes where the air is thin, e.g. ambient pressures below 95 kPa. As can be seen in the graph of FIG. 4, cold starting performance is improved by the split main fuel injection strategy of the cold start mode described herein (open circles) in comparison with the normal mode (closed circles), especially in relatively cold ambient conditions.

Figure 5:
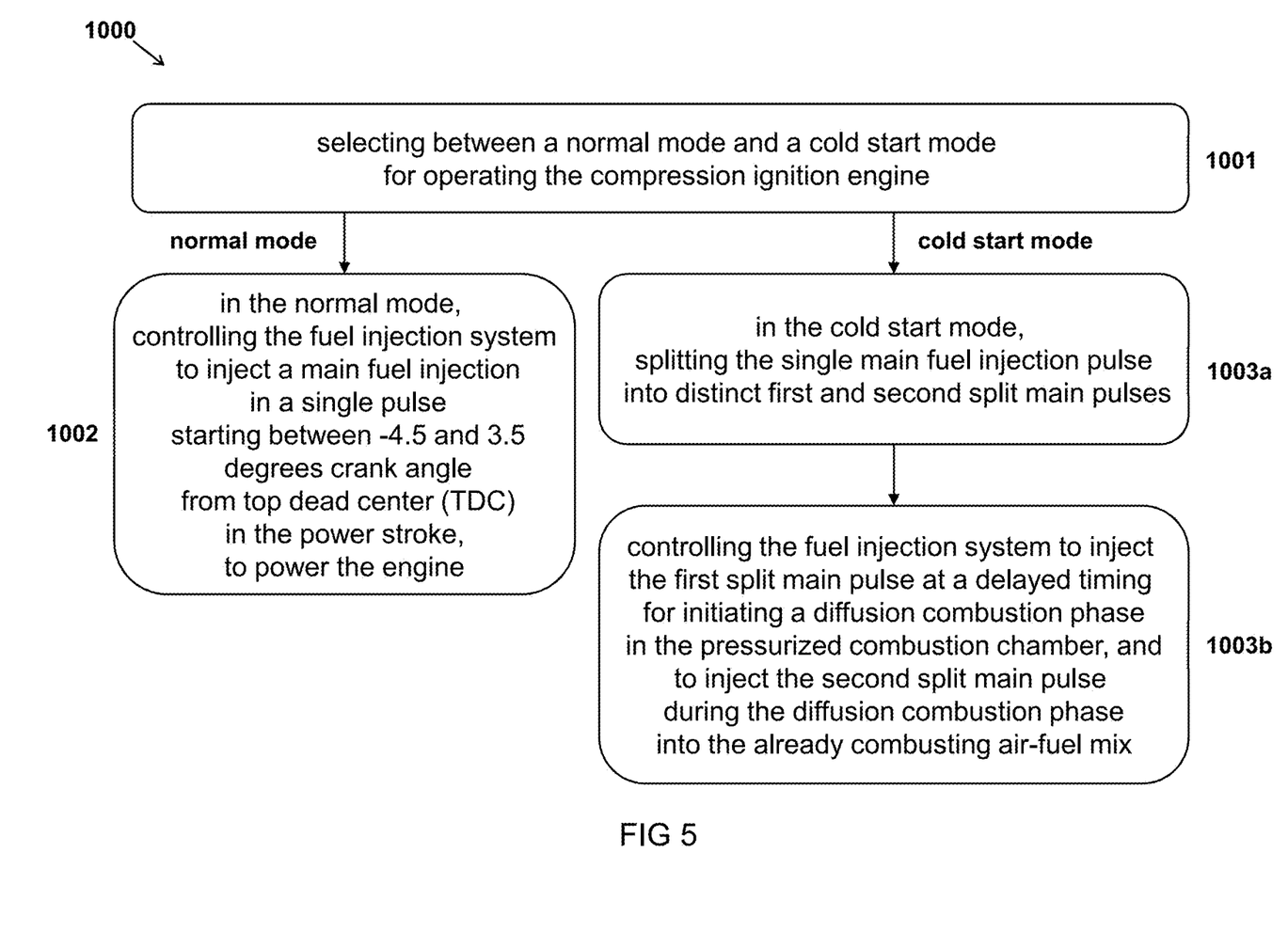
FIG. 5 represents a method for improving starting behaviour of a compression ignition engine.

FIG. 5 illustrates an embodiment of a method 1000 for improving cold start behaviour of a compression ignition engine comprising a plurality of cylinders, a valve actuation system arranged for opening and closing intake valves and exhaust valves of each cylinder of said plurality of cylinders, and a fuel injection system arranged for injecting fuel into a combustion chamber of each cylinder. Optionally, but not necessarily, each cylinder of the plurality of cylinders is arranged for conducting a four-stroke Miller cycle as described herein. The method 1000 comprises the following steps.

Step 1001: selecting a normal mode or a cold start mode for operating the compression ignition engine. Step 1002: in the normal mode, controlling the fuel injection system to inject the main fuel injection in a single pulse. Step 1003: in the cold start mode, splitting the reduced main fuel injection into a first split main and a second split main (1003a), and controlling the fuel injection system to inject the first and second split main in two distinct pulses, wherein the first split main is injected at a delayed timing for initiating a diffusion combustion phase in the pressurized combustion chamber, and wherein the second split main is injected during the diffusion combustion phase into the already combusting air-fuel mix (1003b).

The invention applies not only to commercial vehicle applications where the compression ignition engine improves startup behavior of the vehicle, but also to other technical, agricultural or industrial applications where compression ignition engine is used, e.g. in heavy equipment or external power sources. It will be clear to the skilled person that the invention is not limited to any embodiment herein described and that modifications are possible which may be considered within the scope of the appended claims. Also kinematic inversions are considered inherently disclosed and can be within the scope of the invention. In the claims, any reference signs shall not be construed as limiting the claim.

The terms 'comprising' and 'including' when used in this description or the appended claims should not be construed in an exclusive or exhaustive sense but rather in an inclusive sense. Thus expression as 'including' or 'comprising' as used herein does not exclude the presence of other elements, additional structure or additional acts or steps in addition to those listed. Furthermore, the words 'a' and 'an' shall not be construed as limited to 'only one', but instead are used to mean 'at least one', and do not exclude a plurality. Features that are not specifically or explicitly described or claimed may additionally be included in the structure of the invention without departing from its scope.

Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. To the extent that structure, material, or acts are considered to be essential they are inexpressively indicated as such. Additions, deletions, and modifications within the purview of the skilled person may generally be made without departing from the scope of the invention, as determined by the claims.

The invention claimed is:

1. A compression ignition engine with a plurality of cylinders, comprising:
    a valve actuation system, arranged for opening and closing intake valves and exhaust valves of each cylinder of said plurality of cylinders;
    a fuel injection system, arranged for injecting fuel into a combustion chamber of each cylinder; and
    a controller, arranged for controlling the valve actuation system and the fuel injection system;
    wherein the controller is arranged for selecting between a normal mode or a cold start mode for operating the compression ignition engine;
    wherein, in the normal mode, the controller is arranged for controlling the fuel injection system to inject a main fuel injection in a single pulse between 3.5 degrees crank angle before and 4.5 degrees crank angle after top dead center (TDC) in the power stroke, to power the engine;
    wherein, in the cold start mode, the controller is arranged for splitting the single main fuel injection pulse into distinct first and second split main pulses; and
    wherein the controller is arranged for controlling the fuel injection system to inject the first split main pulse at a delayed timing for initiating a diffusion combustion phase and providing a combusting air-fuel mix in the pressurized combustion chamber, and to inject the second split main pulse during the diffusion combustion phase into the combusting air-fuel mix.

2. The compression ignition engine according to claim 1, wherein the controller is arranged for calculating and calibrating a start and an end of the first split main pulse with respect to TDC, and for calculating and calibrating a start and an end of the second split main pulse with respect to the end of the first split main pulse.

3. The compression ignition engine according to claim 1, wherein the first split main pulse comprises a fuel quantity between 75% and 98% of a fuel quantity of the main fuel injection pulse, and wherein the controller is arranged for controlling the fuel injection system to inject the first split main pulse between TDC and 4.5 degrees crank angle after TDC.

4. The compression ignition engine according to claim 1, wherein the second split main pulse comprises a fuel quantity between 2 and 25% of a fuel quantity of the main fuel injection pulse, and wherein the controller is arranged for controlling the fuel injection system to start injecting the second split main pulse between 0.5 and 7 degrees crank angle after an end of the first split main pulse.

5. The compression ignition engine according to claim 1, wherein the controller is arranged for selecting the cold start mode when the ambient temperature is below a temperature threshold value and/or the ambient pressure is below a pressure threshold value.

6. The compression ignition engine according to claim 5, wherein the temperature threshold value is between 10 and −40 degrees Celsius.

7. The compression ignition engine according to claim 6, wherein the ambient pressure threshold value is between 60 and 95 kPa.

8. The compression ignition engine according to claim 5, wherein the ambient pressure threshold value is between 60 and 95 kPa.

9. The compression ignition engine according to claim 1, wherein the controller is arranged for switching between the normal mode and the cold start mode based on an engine speed.

10. The compression ignition engine according to claim 9, wherein the engine speed is an idle speed between 500-600 RPM.

11. The compression ignition engine according to claim 1, wherein the controller is arranged for switching between the normal mode and the cold start mode based on an actual compression pressure.

12. The compression ignition engine according to claim 1, wherein the controller is further arranged for controlling the fuel injection system to inject a pilot injection into the combustion chamber before a start of the single main fuel injection pulse in the normal mode, and before a start of the first split main pulse in the cold start mode.

13. The compression ignition engine according to claim 12, wherein the pilot injection is between 7.5% and 17.5% of the main fuel injection, and wherein the controller is arranged for controlling the fuel injection system to start injecting the pilot injection between 27 and 1.5 degrees crank angle before the start of the main fuel injection.

14. The compression ignition engine according to claim 1, wherein the controller is arranged for controlling the valve actuation system such that each cylinder is arranged for conducting a four-stroke Miller cycle in which a reduced part of intake air is compressed in a compression stroke.

15. A commercial vehicle, comprising a compression ignition engine according to claim 1.

16. A method for improving cold start behavior of a compression ignition engine comprising a plurality of cylinders, a valve actuation system arranged for opening and closing intake valves and exhaust valves of each cylinder of said plurality of cylinders, and a fuel injection system arranged for injecting fuel into a combustion chamber of each cylinder;
wherein the method comprises the steps of:
selecting between a normal mode and a cold start mode for operating the compression ignition engine;
in the normal mode:
controlling the fuel injection system to inject a main fuel injection in a single pulse between 3.5 degrees crank angle before and 4.5 degrees crank angle after top dead center (TDC) in the power stroke, to power the engine;
in the cold start mode:
splitting the single main fuel injection pulse into distinct first and second split main pulses; and
controlling the fuel injection system to inject the first split main pulse at a delayed timing for initiating a diffusion combustion phase and providing a combusting air; fuel mix in the pressurized combustion chamber, and to inject the second split main pulse during the diffusion combustion phase into the combusting air-fuel mix.

* * * * *